US012173790B2

(12) United States Patent
Bedert et al.

(10) Patent No.: US 12,173,790 B2
(45) Date of Patent: Dec. 24, 2024

(54) METHODS AND SYSTEMS FOR A TRANSMISSION PUMP ASSEMBLY

(71) Applicant: Dana Belgium N.V., Bruges (BE)

(72) Inventors: Jan A. Bedert, Oostduinkerke (BE); Bert Hannon, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/335,013

(22) Filed: Jun. 14, 2023

(65) Prior Publication Data

US 2024/0003418 A1 Jan. 4, 2024

Related U.S. Application Data

(60) Provisional application No. 63/367,460, filed on Jun. 30, 2022.

(51) Int. Cl.
*F16H 57/04* (2010.01)
*F16H 61/00* (2006.01)

(52) U.S. Cl.
CPC ..... *F16H 61/0031* (2013.01); *F16H 61/0009* (2013.01); *F16H 2061/0037* (2013.01)

(58) Field of Classification Search
CPC ............ F16H 61/0031; F16H 61/0009; F16H 2061/0037; F16H 57/0435; F16H 57/0441; F16H 57/0446; F16H 61/0025
See application file for complete search history.

(56) References Cited

U.S. PATENT DOCUMENTS

| | | | | |
|---|---|---|---|---|
| 8,827,660 | B2 | 9/2014 | Frokjaer et al. | |
| 9,188,114 | B2 | 11/2015 | Kuttler et al. | |
| 2022/0389944 | A1* | 12/2022 | Hironaka | F16H 61/0206 |

FOREIGN PATENT DOCUMENTS

| | | | | | |
|---|---|---|---|---|---|
| CN | 105417419 | A | * | 3/2016 | B66D 1/12 |
| DE | 102016207134 | B3 | * | 9/2017 | F16D 48/02 |
| DE | 102016223386 | A1 | * | 5/2018 | F16H 61/30 |
| DE | 102020100293 | A1 | * | 7/2021 | F16H 61/00 |

* cited by examiner

*Primary Examiner* — Tisha D Lewis
(74) *Attorney, Agent, or Firm* — McCoy Russell LLP

(57) ABSTRACT

A transmission system is provided. The transmission system includes an electric motor rotationally coupled to a first pump, a second pump, and a third pump via a drive shaft, where an output of the first pump is in fluidic communication with a lubrication circuit and where an output of the third pump is in fluidic communication with an actuation circuit. The transmission system further includes a valve fluidly coupled to the output of the first pump and an output of the second pump and a controller including instructions stored in non-transitory memory that when executed during a first operating condition, cause the controller to selectively operate the valve based on a change in one or more operating conditions in the transmission system.

17 Claims, 5 Drawing Sheets

METHODS AND SYSTEMS FOR A TRANSMISSION PUMP ASSEMBLY

CROSS REFERENCE TO RELATED APPLICATION

The present application claims priority to U.S. Provisional Application No. 63/367,460, entitled "METHODS AND SYSTEMS FOR A TRANSMISSION PUMP ASSEMBLY," and filed on Jun. 30, 2022. The entire contents of the above-listed application are hereby incorporated by reference for all purposes.

TECHNICAL FIELD

The present disclosure relates to a transmission system with multiple pumps and a valve that deliver fluid to actuation and lubrication circuits.

BACKGROUND AND SUMMARY

Transmissions, such as automatic transmissions, utilize pumps which deliver oil or other fluid to selected systems in the transmission such as clutch actuation systems, torque converters, and lubricated components, for instance. In some transmissions that receive motive power from an internal combustion engine, these pumps are conventionally coupled to the engine's crankshaft. For this type of transmission pump, the speed of the pump is a fixed ratio of the engine's speed. The pump's size is therefore selected based on the lowest expected pump speed which in many cases correlates to the engine's idle speed. To reduce flow losses and increase system efficiency, variable displacement pumps have been utilized in certain transmissions.

U.S. Pat. No. 9,188,114 B2 to Kuttler et al. teaches an embodiment of a hydraulic system in which multiple pumps are used to deliver oil to multiple hydraulic machines. These pumps are jointly rotated by an internal combustion engine. Therefore, if the pumps are sized based on the engine's idle speed and flow demands at idle, flow losses may occur at other operating points, thereby increasing system inefficiency. Additionally, in the move toward powertrain electrification, traction motors are not able to take the place of the engines in these pump systems, and provide the same hydraulic functionality since traction motors do not rotate while the vehicle is at standstill. Further in Kuttler's hydraulic system electrically actuated valves are arranged in different hydraulic lines which route the oil to the hydraulic machines. These valves allow a complex flow pattern for delivery of oil to the hydraulic machines to be achieved. However, the valve control may use a complex control strategy that uses a greater amount of computing resources than a more simplified control strategy. The valves may further increase the likelihood of system inoperability due to valve degradation and increase the system's size.

The inventors have recognized the aforementioned issues and developed a transmission system to at least partially overcome the issues. The transmission system includes an electric motor rotationally coupled to a first pump, a second pump, and a third pump via a drive shaft. Further in the system, the output of the first pump is in fluidic communication with a lubrication circuit. Additionally, an output of the third pump is in fluidic communication with an actuation circuit. The system further includes a valve fluidly coupled to the output of the first pump and an output of the second pump. The system even further includes a controller designed to selectively operate the valve based on changes in operating conditions in the transmission system. In this way, the system is able to effectively meet lubrication and actuation fluid demands in the transmission, if wanted. Consequently, the transmission's longevity and performance, in relation to shifting for instance, is increased.

The pumps, in one example, may be fixed displacement pumps. As a result, the system's space efficiency may be increased and the likelihood of component degradation may be decreased, in comparison to transmissions that utilize variable displacement pumps, while achieving hydraulic performance targets.

Further, the change in the one or more operating conditions may include initiation or anticipation of a shift event and selectively operating the valve based on the changes in operating conditions may include during or in anticipation of the shift event, operating the valve to inhibit fluidic communication between the outputs of the first pump and the second pump. In this way, the actuation circuit is able to meet the increased flow demands during the shift event and reduce losses when shifting is not occurring or anticipated to occur, thereby increasing system efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A transmission system with a pump assembly that provides fluid for both lubrication and actuation circuits which achieves increased efficiency by reducing flow losses is described herein. The pumps in the pump assembly may be fixed displacement type pumps and are arranged along with a directional control valve in a layout that enables the assembly to achieve flowrate adjustment functionality to meet flowrate demands of hydraulic components during different operating conditions. In this way, the assembly is able to meet both lubrication and actuation flowrate demands during, both shift events as well as in a regime mode, in which shifts are not ongoing, using pumps that are less complex and more space efficient than variable displacement pumps, for instance. Consequently, the system is capable of meeting varying hydraulic demands during a wide variety of operating conditions using pumps that are less prone to degradation. Customer appeal is therefore increased in comparison to more convoluted hydraulic systems.

Figure 1:
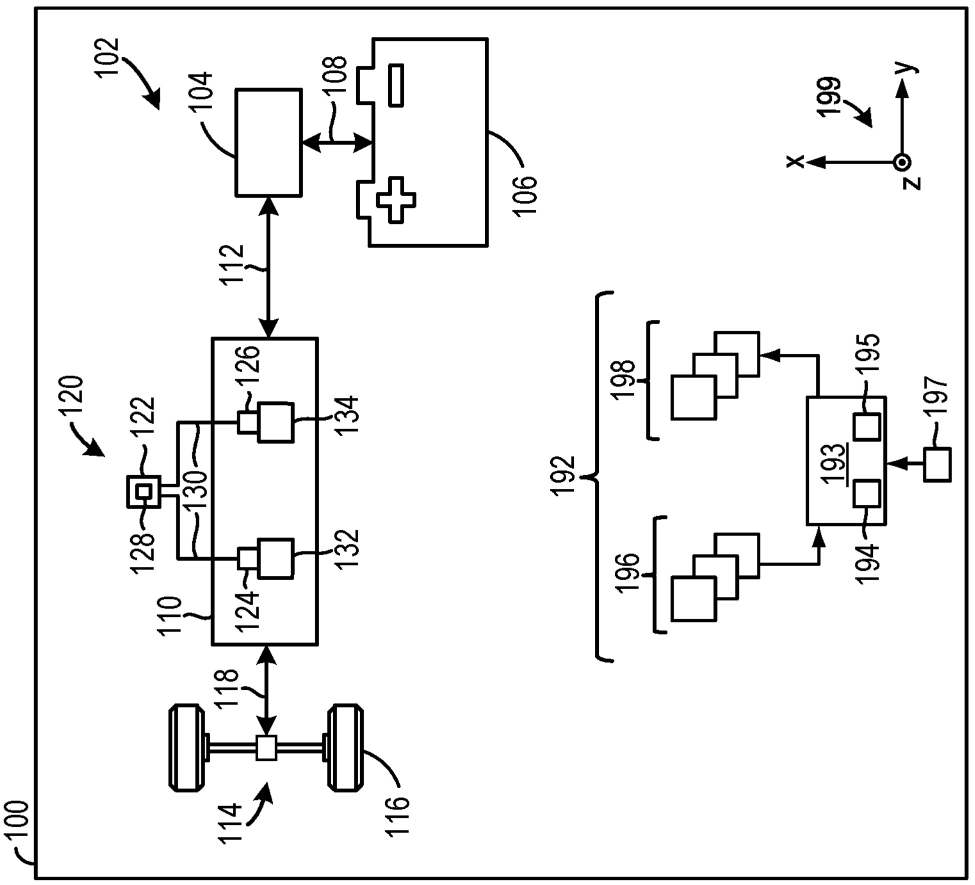
FIG. 1 is a schematic illustration of a vehicle with a transmission system.

FIG. 1 shows a schematic depiction of a vehicle 100. In the illustrated example, the vehicle 100 is an electric vehicle (EV) such as an all-electric vehicle or a hybrid electric vehicle (HEV). In the HEV example, an internal combustion engine may be used to drive another axle or charge a traction battery, for instance. However, the vehicle may be utilized in internal combustion engine (ICE) drivelines in other examples. As such, the transmission system described herein may be used in both electric and ICE drivelines.

The vehicle 100 includes an electric drive unit 102 that includes a traction motor 104 electrically coupled to an energy storage device 106 (e.g., a traction battery, capacitors, combinations thereof, and the like) as indicated by arrows 108.

The traction motor 104 is mechanically coupled to a transmission 110, as denoted via arrows 112, and the transmission 110 is mechanically coupled to a drive axle 114 the transfers mechanical power to drive wheels 116 as indicated via arrows 118. The drive axle may include components such as a differential, axle shafts, and the like. The transmission 110 may be an automatic transmission that is designed to automatically shift between discrete gears in the transmission based on vehicle speed and/or load. For instance, when the transmission is in drive mode, the transmission may shift, in the absence of an operator interacting with a gear selector, between a first gear and a second gear when the vehicle speed surpasses a threshold value. However, numerous suitable automatic shifting strategies have been contemplated.

The vehicle 100 further includes a transmission system 120 that includes a pump assembly 122 designed to deliver fluid (e.g., oil) to a lubrication circuit 124 and an actuation circuit 126 in the transmission 110. The pump assembly 122 includes an electric motor 128 that drive multiple pumps, which are expanded upon herein in relation to the FIGS. 2, 3A, and 3B. Hydraulic lines 130 and/or other suitable conduits establish fluidic communication between the pump assembly 122 and the lubrication circuit 124 as well as the actuation circuit 126.

The lubrication circuit 124 includes suitable components (e.g., lubricant lines, conduits, nozzles, and the like) for delivering lubricant (e.g., oil) to transmission system components 132 such as bearings, shafts, gears, clutches, brakes when the transmission uses a planetary gearset design, and the like. The actuation circuit 216 delivers fluid to transmission components 134 such as clutches, brakes, shift rails, and the like.

The traction motor 104 and the electric motor 128 may include components such as a rotor and a stator that electromagnetically interact during operation to generate motive power. Furthermore, the traction motor may be a motor-generator which also generates electrical energy during regeneration operation.

Further, the motors 104 and 128 may be alternating current (AC) electric motors that are supplied with electrical energy through the use of inverters. These inverters and the other inverters described herein are designed to convert direct current (DC) to alternating current (AC) and vice versa. For instance, the electric motors and the inverters described herein may be three-phase devices, in one use-case example.

The vehicle 100 further includes a control system 192 with a controller 193 as shown in FIG. 1. To elaborate, the controller may be a control unit such as a transmission control unit (TCU), a vehicle control unit (VCU), combinations thereof, and the like. The controller 193 may include a microcomputer with components such as a processor 194 (e.g., a microprocessor unit), input/output ports, an electronic storage medium 195 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 193 may receive various signals from sensors 196 coupled to various regions of the vehicle 100 and specifically the transmission 110. For example, the sensors 196 may include a pedal position sensor designed to detect a depression of an operator-actuated pedal such as an accelerator pedal and/or a brake pedal, speed sensors at the transmission output and input, energy storage device state of charge (SOC) sensor, clutch position sensors, and the like. The speed of each of the motors in the system may be ascertained from the amount of power sent from the inverters to the motors or may be determined via sensors coupled to the motors. An input device 197 (e.g., accelerator pedal, brake pedal, drive mode selector, combinations thereof, and the like) may further provide input signals indicative of an operator's intent for vehicle control.

Upon receiving the signals from the various sensors 196 of FIG. 1, the controller 193 processes the received signals, and employs various actuators 198 of vehicle components to adjust the components based on the received signals and instructions stored on the memory of controller 193. For example, the controller 193 may receive an accelerator pedal signal indicative of an operator's request for increased vehicle acceleration. In response, the controller 193 may command operation of the inverters to adjust traction motor power output and increase the power delivered from the motor to the transmission 110. The controller 193 may, during certain operating conditions, be designed to send commands to clutches, brakes, inverters, and valves to carry out a shift event in the transmission system. Responsive to receiving the commands, actuators in or associated with the controllable components may be used to adjust these components. Thus, the controller 193 may be designed to control the clutches and/or brakes to shift between two of the transmission's operating gears. Transmission shifting methods are described in greater detail herein with regard to FIGS. 4A-5. The other controllable components in the vehicle may function in a similar manner with regard to sensor signals, control commands, and actuator adjustment, for example.

Figure 2:
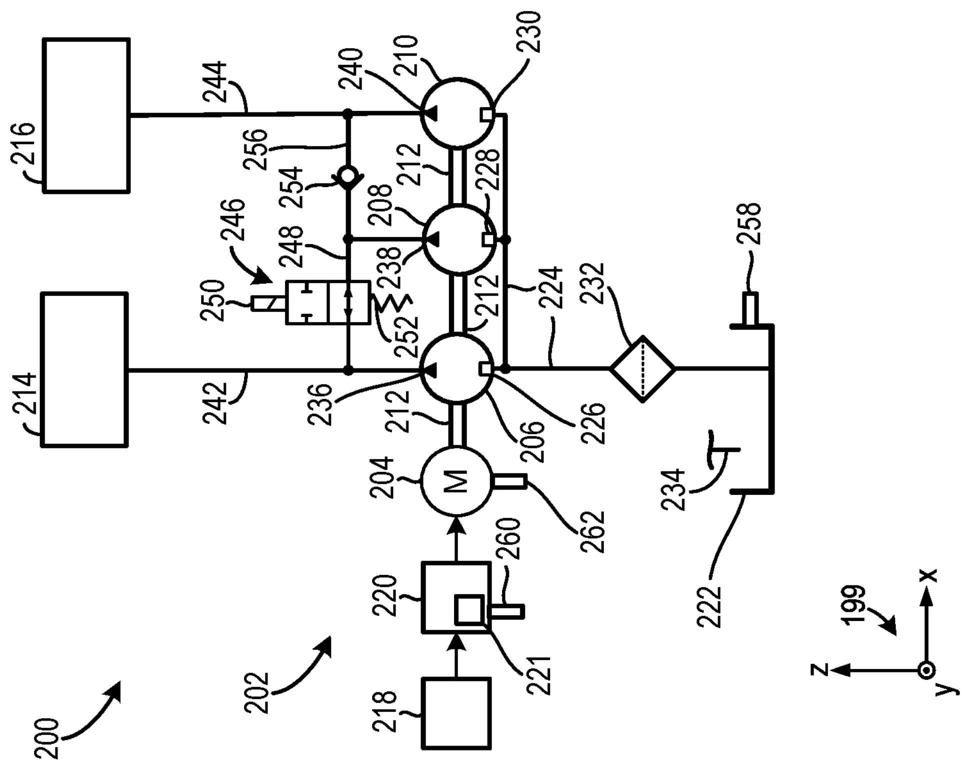
FIG. 2 is a detailed illustration of an example pump assembly for a transmission system.
Figure 3B:
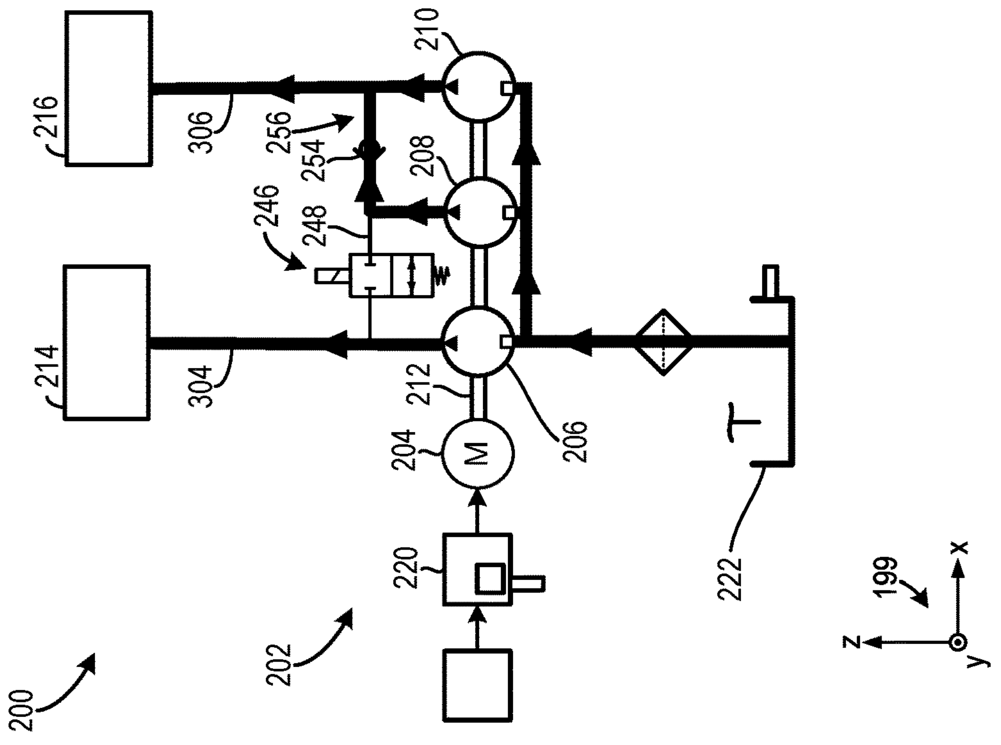
FIGS. 3A-3B are illustrations of the pump assembly, depicted in FIG. 2, in different flow configurations.

An axis system 199 is provided in FIG. 1, as well as FIGS. 2-3B, for reference. The z-axis may be a vertical axis (e.g., parallel to a gravitational axis), the x-axis may be a lateral axis (e.g., horizontal axis), and/or the y-axis may be a longitudinal axis. However, alternate orientations of the axes may be used, in other examples.

FIG. 2 shows an example of a pump assembly 202 that may be included in a transmission system such as the transmission system 120, shown in FIG. 1 or another suitable transmission system. The working fluid in the system may be oil, as previously discussed. The pump assembly 202, shown in FIG. 2, is an example of the pump assembly 122, shown in FIG. 1. Therefore, the transmission system 200 shown in FIG. 2 may be included in the vehicle 100, shown in FIG. 1. Further, the control system 192, shown in FIG. 1, may be used to adjust the controllable components in the transmission system depicted in FIG. 2.

The pump assembly 202 includes an electric motor 204 that drives a first pump 206, a second pump 208, and a third pump 210 via a drive shaft 212. The first, second, and third pumps may be fixed displacement pumps. In such an example, the displacement of each of these pumps may vary. For instance, the first pump 206 may have a greater displacement than the second pump 208 and the second pump may have a greater displacement than the third pump. In this way, the size of the pumps may be selected to meet the granular flow demands of a lubrication circuit 214 and an actuation circuit 216. As previously discussed, the lubrication circuit 214 provides oil or other suitable fluid to moving components such as bearings, gears, clutches, and the like while the actuation circuit 216 provides oil or other suitable fluid to adjustable components in the transmission such as clutches, brakes, shift rails, and the like. For instance, the clutches may be wet friction clutches that are designed to shift the transmission between discrete gears. It will be understood, that wet friction clutches includes friction plates that allow torque transfer through the clutch to be modulated.

Types of fixed displacement pumps that may be used for the pumps 206, 208, and 210 may include external gear pumps in which two gear are used to increase the pressure of the fluid flowing therethrough. Due to the simplicity of the external gear pumps, development of the pump assembly is simplified due to a reduction in the effort devoted to integration of the pumps into the system, when compared to variable displacement pumps. The applicability of the pump assembly is therefore expanded to a wider variety of vehicles which increases customer appeal.

The electric motor 204 may receive electric power from an energy storage device 218 by way of an inverter 220. The inverter 220 may receive control commands from the controller which adjust the speed of the drive shaft 212 and therefore the flowrate of the pumps. The inverter 220 may include a control unit 221 which electronically communicates with another control unit such as a TCU. The control unit 221 include circuitry such as a processor, memory, input/output ports, and the like. However, in other examples, the inverter 220 may be omitted.

The electric motor 204 may be designed to run at a regime speed (e.g., 1,000 revolutions per minute (RPM), 1,200 RPM, or 1,500 RPM in some use case examples). The regime speed may be selected to allow the pumps to meet flowrate demands of the lubrication circuit when a shift event is not occurring. Therefore, the regime speed may be selected based on factors such as the displacement of the pumps, the lubrication needs of the transmission components, the lubrication system layout, and the like. The electric motor 204 may also be designed to operate at higher speeds. To elaborate, during shift events the electric motor 204 may be operated at a higher speed (e.g., peaked) for a comparatively short duration to meet the flow demands of the actuation circuit during the shift. The motor peaking events represent a comparatively small percentage of the operational time from the transmission system. The transmission system and specifically the pump drive will operate in the regime condition for a considerably longer duration.

It will be appreciated that the electric motor 204 has a certain thermal capacitance that allows the motor to produce more torque and power during a certain time period prior to reaching an over-temperature condition (e.g., overheating). Therefore, the electric motor which drives the pumps may be downsized along with the inverter 220 to reduce the weight and complexity of the system while increasing system efficiency. However, while the motor is operated at these higher speeds and with sustained/higher torque (i.e., higher power), the motor temperature may be monitored to reduce the chance of motor thermal degradation. For instance, motor speed may be reduced when the motor temperature exceeds a threshold value (indicative of motor component degradation). In this way, the motor can be downsized but controlled to reduce the chance of degradation during peaking events.

A fluid reservoir 222 (e.g., sump) is further included in the pump assembly 202. Fluid lines 224 provide fluidic communication between the fluid reservoir 222 and the pumps 206, 208, and 210 which extend therebetween. To elaborate, the lines 224 are coupled to inputs 226, 228, and 230 of the first, second, and third pumps, respectively. A filter 232 is included in the line which extends into the reservoir. However, the filter may be omitted from the system in other embodiments. Additionally, a return line 234 that may be in fluidic communication with the lubricated components and adjustable components which correspond to the lubrication circuit 214 and the actuation circuit 216. In this way, oil is circulated through the system.

The pumps 206, 208, 210 include outlets 236, 238, 240 respectively. The outlet 236 of the first pump 206 is in fluidic communication with the lubrication circuit 214 via a line 242 and the outlet 240 of the third pump 210 is in fluidic communication with the actuation circuit 216 via line 244.

A valve 246 is positioned in a cross-over line 248 which connects the outlet 236 of the first pump 206 with the outlet 238 of the second pump 208. The valve 246 includes a solenoid 250 designed to change the state of the valve 246. In an open state, shown in FIGS. 2 and 3A, the valve permits fluid flow between the outlet 238 of the second pump 208 and the line 242 which connects the outlet 236 of the first pump 206 and the lubrication circuit 214. Conversely, in a closed state, shown in FIG. 3B, the valve inhibits fluid flow between the outlet 238 of the second pump 208 and the line 244 which connects the outlet 236 of the first pump 206 and the lubrication circuit 214.

In the illustrated example, the valve 246 is in an open position when the solenoid 250 is de-energized and conversely is in a closed state when the solenoid 250 is energized. A spring 252 allows the valve to return to the open position when the solenoid is de-energized. However, other valve actuation schemes have been contemplated. For instance, energization of the solenoid may place the valve in its open position, in alternate embodiments.

A check valve 254 is positioned in a cross-over line 256 which connects the outlet 238 of the second pump 208 with the outlet 240 of the third pump 210. The check valve 254 is designed to permit fluid flow between the outlet 238 of the second pump 208 and the line 244 which connects the outlet 240 of the third pump 210 to the actuation circuit 216 when the pressure in the cross-over line 256 exceeds a threshold value (e.g., 1 bar, 3 bar, or 5 bar, in some use-case examples). The check valve may be designed with a relatively low opening pressure to reduce losses.

In the illustrated example, a temperature sensor 258 is coupled to the fluid reservoir 222 and a current sensor 260 is coupled to the inverter 220. A temperature sensor 262 may also be coupled to the motor 204. These sensors may send signals to the controller 193. In other examples, different sensor arrangements may be used in the system.

Figure 3A:
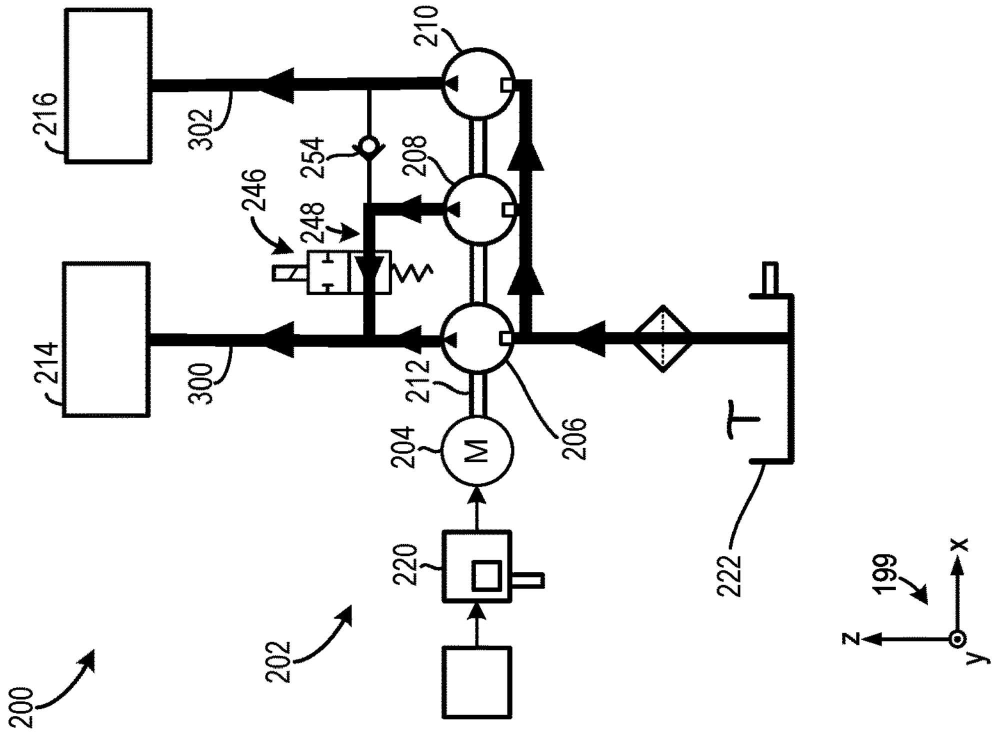

FIGS. 3A and 3B show the transmission system 200 and the pump assembly 202 with the valve in different configurations that provide different flowrates to the lubrication circuit 214 and the actuation circuit 216.

In FIG. 3A the flow path 300 between the reservoir 222 and the lubrication circuit 214 is indicated along with the flow path 302 between the reservoir and the actuation circuit 216. In FIG. 3A the inverter 220 is operated to drive the motor 204 at a regime speed, the valve 246 is in an open configuration that enables oil flow in the cross-over line 248, and the check valve 254 is closed. As shown, fluid from the outlets of the first pump 206 and second pump 208 is delivered to the lubrication circuit 214 while fluid from the outlet of the third pump 210 is delivered to the actuation circuit 216. In this way, the valve 246 is operated to flow a desired amount of oil to the lubrication circuit 214 while a decreased amount of oil flow to the actuation circuit 216. In this configuration both the first pump 206 and the second pump 208 are working together and are providing the required flow to the lubrication circuit 214. In this event, the third pump 210 functions as a stand-alone pump and is providing fluid to the actuation circuit 216 at a flowrate that compensates for the losses in that circuit. By design pump assembly 202 may be sized such that the lubrication circuit 214 and the actuation circuit 216 receive a targeted amount of oil at the selected regime speed which reduces losses in the system.

In FIG. 3B, the flow path 304 between the reservoir 222 and the lubrication circuit 214 is indicated along with the flow path 306 between the reservoir and the actuation circuit 216. Further, in FIG. 3B the inverter 220 is operated to drive the motor 204 at a higher speed, the valve 246 is in a closed configuration that inhibits oil flow in the cross-over line 248, and the check valve 254 opens to allow oil flow through the cross-over line 256.

As shown in FIG. 3B, fluid from the outlet of the first pump 206 is delivered to the lubrication circuit 214 while fluid from the outlets of the second pump 208 and the third pump 210 is delivered to the actuation circuit 216 due to the fact that the pressure increase in the cross-over line causes the check valve 254 to open. In this way, the valve 246 may be strategically adjusted to meet flow demands of the actuation circuit 216 during transient conditions (e.g., shift events).

Figure 4A:
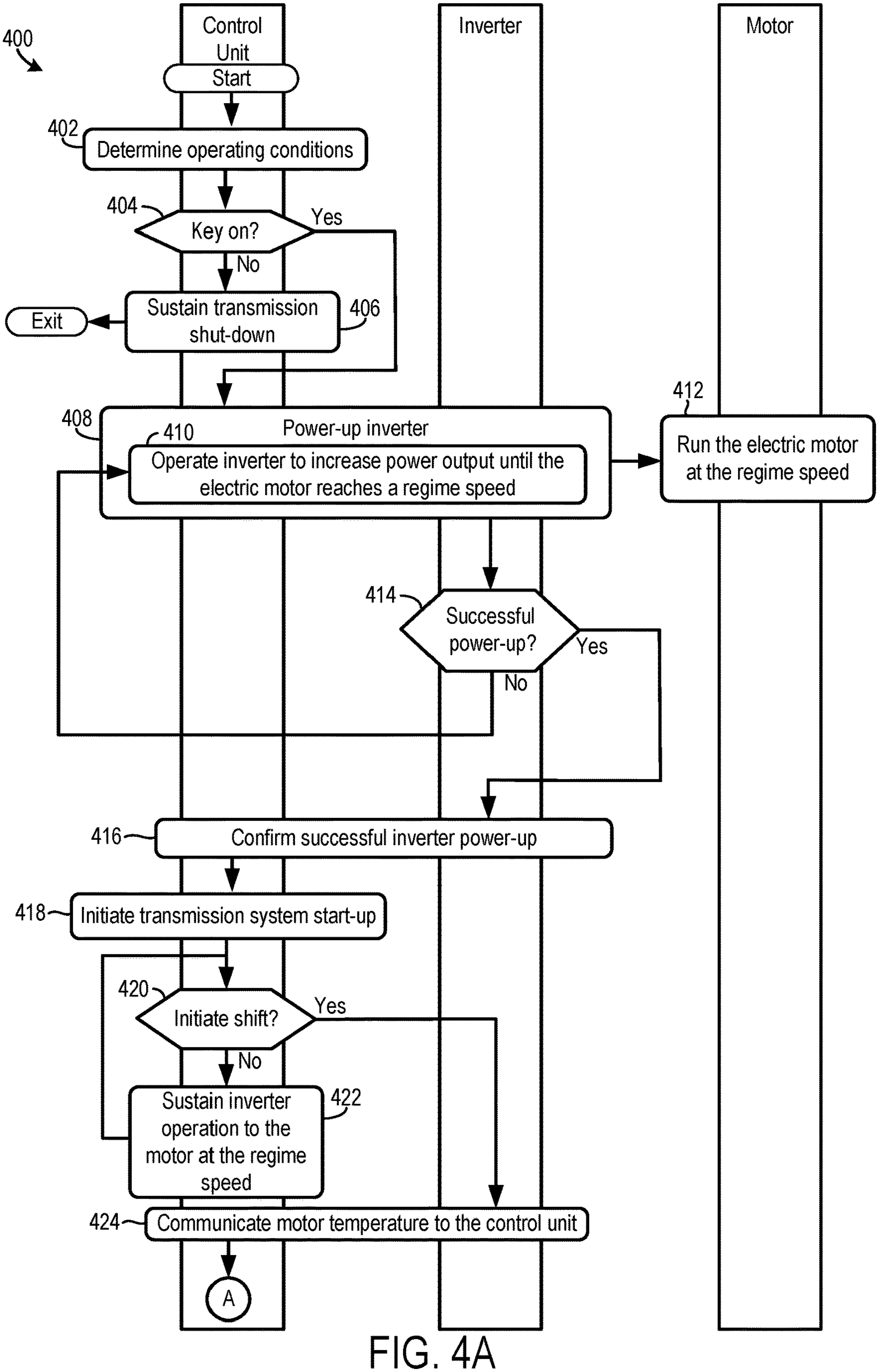
FIGS. 4A-4B are flow charts depicting a method for operation of a transmission system.
Figure 4B:
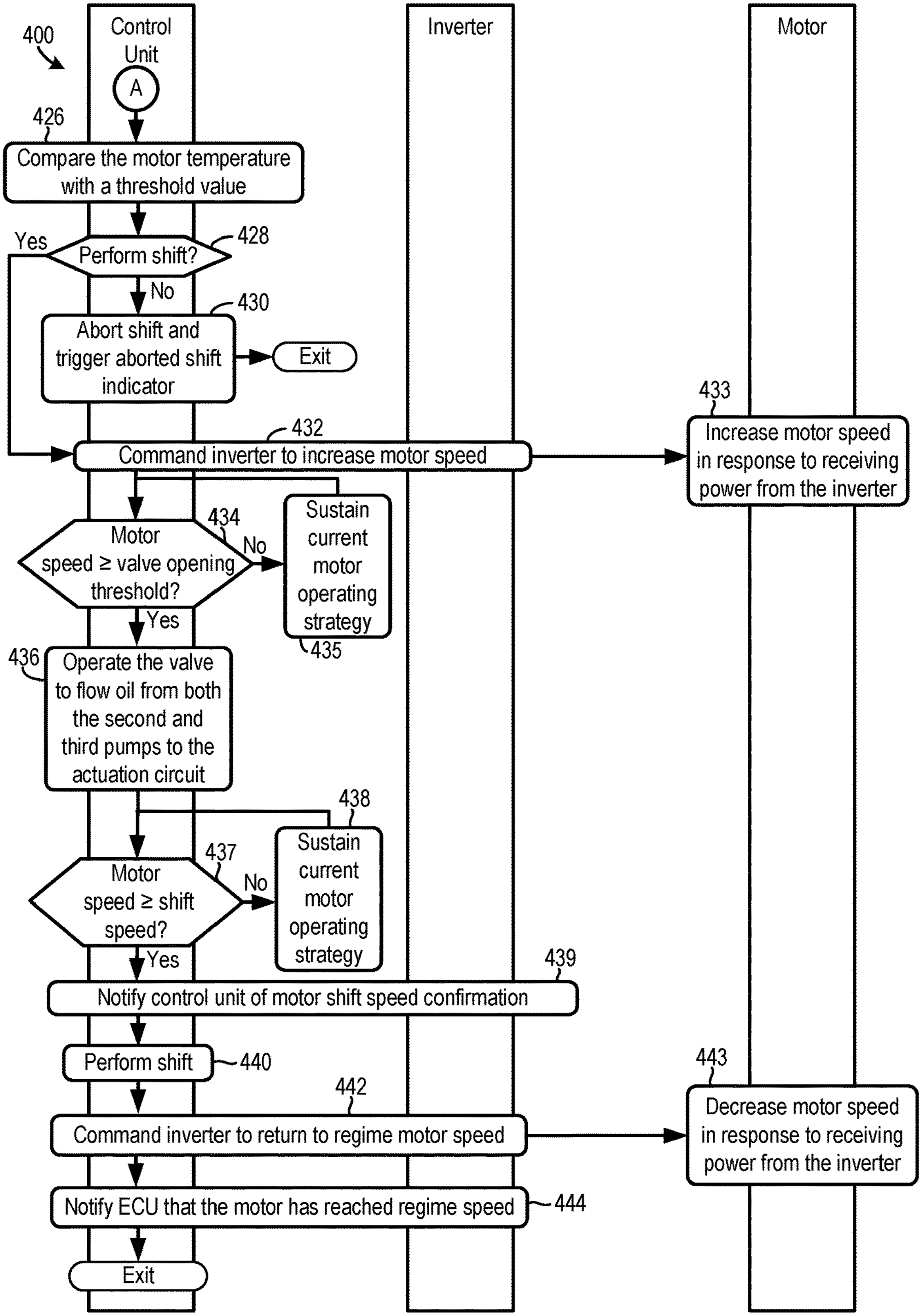

FIGS. 4A and 4B show a method 400 for operation of a transmission system. The method 400 may be carried out by one of the transmission systems or a combination of the transmission systems described above with regard to FIGS. 1-3B. Specifically, the method 400 shows a control unit (e.g., a TCU), inverter, and motor which implement different method steps. The control unit may correspond to the controller 193, shown in FIG. 1, the inverter may correspond to the inverter 220 shown in FIG. 2, and the motor may correspond to the electric motor 204, in one example. However, the method 400 may be carried via other suitable transmission systems or combination of transmission systems, in other examples. Furthermore, the method 400 may be implemented by a controller that includes a processor and memory, as previously discussed.

At 402, the method includes determining operating conditions. The operating conditions may include key state (on/off), inverter current, traction motor speed, battery state of charge (SOC), motor temperature, and the like.

Next at 404, the method includes judging if a key-on is occurring in the vehicle. For instance, a sensor coupled to a key interface or other suitable starting interface (e.g., a button, switch, touch interface, wireless communication interface, combinations thereof, and the like) may be used to determine if an operator has interacted therewith.

If it is determined that the vehicle is not experiencing a key-on condition (NO at 404) the method moves to 406. At 406, the method includes sustaining transmission shutdown. For instance, the electric motor used to drive the pumps in the pump assembly may remain off. After 406, the method is exited. However, in other examples, the method may return to step 402 after step 406.

On the other hand, if it is determined that the vehicle is experiencing a key-on condition (YES at 404), the method proceeds to 408 where the method includes powering up the inverter which is coupled to the electric motor in the pump assembly. Powering up the motor includes at 410 operating the inverter to increase power output until the electric motor reaches a regime speed. At 412, the method includes running the electric motor at the regime speed.

Next at 414 the method includes, determining if the transmission system has been successfully powered-up. The inverter current output may be monitored and a threshold current indicative of the motor running at the regime speed may be used to make the determination at step 414.

If it is determined that the transmission system has not been successfully powered-up (NO at 414) the method returns to 408. Conversely, if it is determined that the transmission system has been successfully powered-up (YES at 414) the method moves to 416. At 416, the method includes confirming successful inverter power-up. For instance, the inverter may send a message to the control unit that indicates the motor has reached the regime speed.

Next at 418, the method includes initiating transmission system start-up. For instance, a start-up procedure for the transmission may be initiated in which certain clutches, brakes, and the like are engaged or disengaged and moving components are lubricated.

At 420, the method includes judging if a shift should be initiated in the transmission system. This judgement may take into account parameters such as vehicle speed, transmission load, and/or transmission input and output speeds may be used to make this determination. For instance, if vehicle speed exceeds or falls below a threshold value, a shift may be initiated.

If it is determined that the shift should not be initiated (NO at 420) the method proceeds to 422. At 422, the method includes sustaining inverter operation to maintain the motor at the regime speed. Step 422 may further include sustaining the clutches in their current positions (e.g., engaged or disengaged).

If it is determined that the shift should be initiated (YES at 420) the method moves to 424. At 424, the method includes communicating the motor temperature to the control unit. For instance, the inverter which receives a signal from a motor temperature senor may relay this signal to the control unit. In other examples, the motor temperature may be modeled based on the inverter's output current. Further, the motor temperature may be sent to the control unit at predetermined intervals.

In FIG. 4B, at 426 the method includes comparing the motor temperature with a threshold value that may be indicative of an over-temperature condition. Next, at 428, the method includes judging if the transmission should perform a shift. This determination may take into account the comparison between the motor temperature and the threshold value. If the motor temperature exceeds the threshold value, the method may judge that a shift should not be performed and vice versa. In this way, the likelihood of motor degradation cause by over-temperature conditions may be decreased.

If it is judged that a shift should not be performed (NO at 428) the method moves to 430. At 430, the method includes aborting the shift and trigger an aborted shift indicator. After 430 the method may be exited or alternatively the method may return to 426.

If it is judged that a shift should be performed (YES at 428) the method moves to 432. At 432, the method includes commanding the inverter to increase motor speed. For instance, the control unit may send the inverter a command signal that increases inverter current output. To elaborate, the motor speed may be peaked to allow the pumps to deliver a desired flowrate of oil to the actuation circuit during a shift event. It will be understood that the inverter may communicate motor speed to the control unit at regular intervals (e.g., the communication bus rate).

At 433, the method includes increasing motor speed in response to receiving power from the inverter and at 434 the method includes judging if the motor speed is greater than or equal to a threshold speed for closing the valve. As previously indicated, the motor speed may be sent from the inverter to the control unit at predetermined intervals. This motor speed threshold may be a speed between the regime speed and a shift speed threshold, discussed in greater detail below. Further, the motor speed threshold may be predetermined, in one example, or may be calculated by the control algorithm, in other examples.

If it is judged that the motor speed is not greater than or equal to the threshold (NO at 434) the method moves to 435 where the method includes sustaining the current motor operating strategy. Conversely, if it is judged that the motor speed is greater than or equal to threshold (YES at 434) the method moves to 436.

At 436, the method includes closing the valve to flow oil from both the second and third pumps to the actuation circuit. To elaborate, the solenoid in the valve may be energized to place the valve in a configuration in which fluid flow through the cross-over conduit between the output of the first pump and the second pump is inhibited. It will be appreciated that in alternate examples, steps 434 and 436, as well as other steps, in some cases, may be implemented as logic in the inverter's control unit.

At 437 the method including determining if the motor speed is greater than or equal to a shift speed. If it is determined that the motor speed is not greater than or equal to the shift speed (NO at 437) the method moves to 438 where the method includes sustaining the current motor operating strategy. Conversely, if it is determined that the motor speed is greater than or equal to the shift speed (YES at 437) the method moves to 439.

At 439, the method includes notifying the control unit of motor shift speed confirmation. Next at 440, the method includes performing the shift. Performing the shift may include using a hydraulic clutch actuator (e.g., a hydraulically controlled piston) to engage one clutch while another clutch is disengaged.

Next at 442, the method includes commanding inverter to return to regime motor speed. Next at 443 the method includes decreasing motor speed in response to receiving power from the inverter and at 444 the method includes notifying the control unit that the motor has reached regime speed. For instance, the inverter's power output may be reduced and the inverter may send a signal with a message that the inverter power output has reached a value that corresponds to motor regime speed. Method 400 allows the operating efficiency of the transmission to be increased while strategically increasing motor speed to fulfill actuation circuit flowrate demands during shifting transients.

Figure 5:
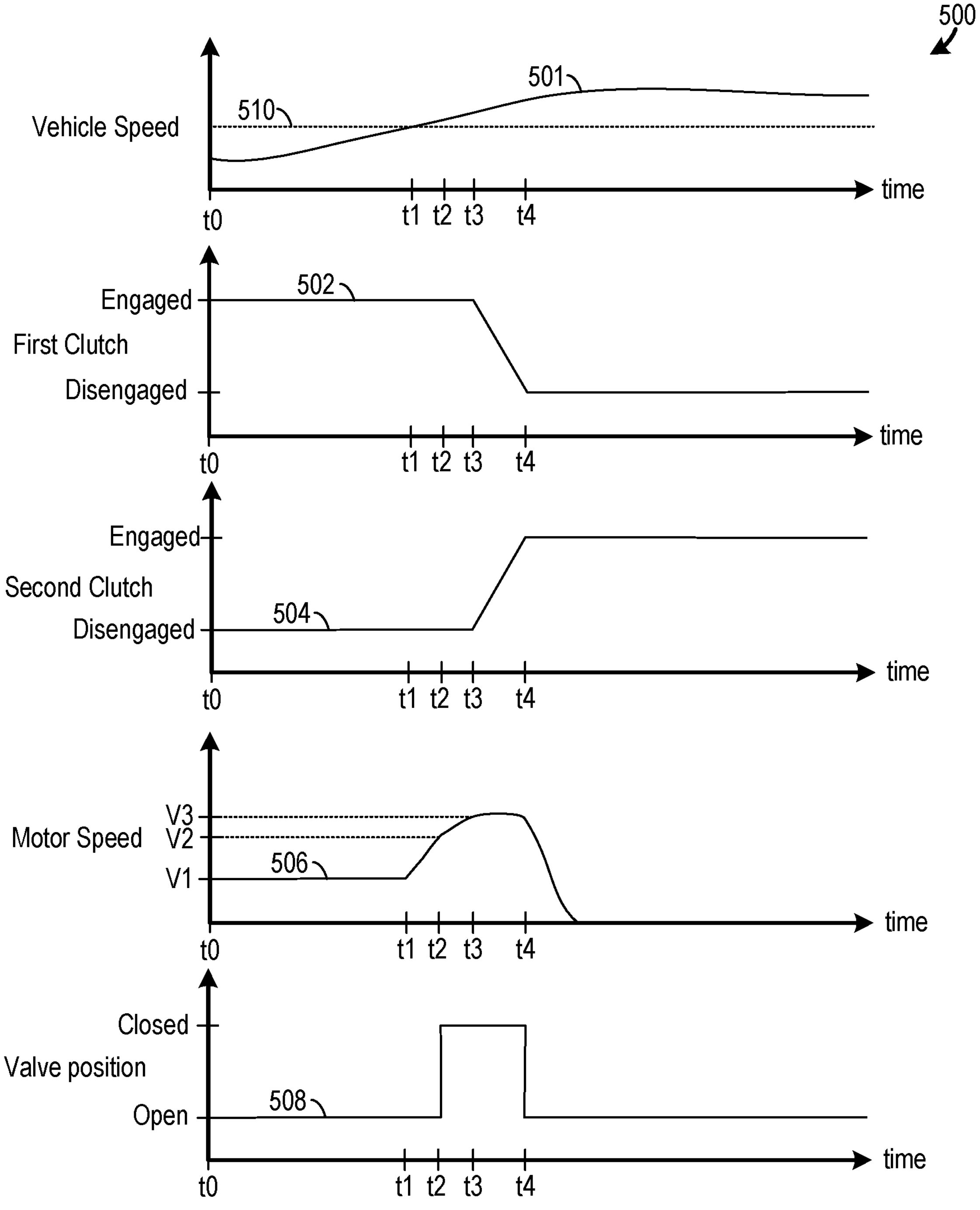
FIG. 5 is a timing diagram for a use-case transmission system control strategy.

FIG. 5 illustrates a timing diagram 500 of a prophetic use-case control strategy for a transmission system, such as any of the previously described transmissions or combinations of the transmissions. In each graph, time is indicated on the abscissa and increases from left to right. The ordinate for plot 501 indicates vehicle speed. The ordinates for plots 502 and 504 indicate the operational states ("Engaged" and "Disengaged") of a first clutch and a second clutch, respectively. The ordinate of plot 506 indicates motor speed and the ordinate of plot 508 indicates the position of the valve in the cross-over line that connect the outlets of the first pump and the second pump ("Open" or "Closed").

From t0 to t1 the vehicle speed increases and at t1 the speed surpasses a threshold value 510. Responsive to the vehicle speed surpassing the threshold value, the electric motor's speed (e.g., the speed of the electric motor 204, shown in FIG. 2) is increased from V1 to V2 at t2. V1 is the regime speed and V2 is the threshold value that triggers valve closing. The valve is then closed at t2 when the first threshold value. Next, at t3, the motor speed surpasses a shift speed threshold (V3). The shift event occurs from t3 to t4. During this shift event, the first clutch transitions into a disengaged state and the second clutch transitions into an engaged state. At t4 the valve is opened and the motor speed decreases until it reaches the regime speed.

It will be understood that the specific clutch control strategy may be more nuanced, in practice. For instance, clutch pressure in the second friction clutch may be less abruptly ramped up to allow a smoother transition into the second gear to occur and reduce the likelihood of unwanted noise, vibration, and harshness (NVH).

The technical effect of the transmission system operating methods described herein is to efficiently operate the transmission system to provide a desired amount of oil to the clutches for engagement during shifting while decreases losses in the system when shifts are not occurring.

FIGS. 1-3B shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission system is provided that comprises: an electric motor rotationally coupled to a first pump, a second pump, and a third pump via a drive shaft; wherein an output of the first pump is in fluidic communication with a lubrication circuit; and wherein an output of the third pump is in fluidic communication with an actuation circuit; a valve fluidly coupled to the output of the first pump and an output of the second pump; and a controller including instructions stored in non-transitory memory that when executed during a first operating condition, cause the controller to: selectively operating the valve based on a change in one or more operating conditions in the transmission system. In one example, the change in the one or more operating conditions may include initiation or anticipation of a shift event. Further in one example, selectively operating the valve based on the change in the one or more operating conditions may include during or in anticipation of the shift event, operating the valve to inhibit fluidic communication between the outputs of the first pump and the second pump. Further in one example, selectively operating the valve based on the change in the one or more operating conditions may include subsequent to the shift event, operating the valve to permit fluidic communication between the outputs of the first pump and the second pump. Still further in one example, the first, second, and third pumps may be fixed displacement pumps. Even further in one example, the transmission system may further comprise a check valve positioned in a line that fluidly connects the output of the second pump with the output of the third pump when a pressure at the output of the second pump exceeds a predetermined value. Further in one example, the actuation circuit may include one or more hydraulic actuators for one or more wet friction clutches and/or brakes.

In another aspect, a method for operation of a transmission system is provided that comprises operating an electric motor to drive a first pump, a second pump, and a third pump via a drive shaft; during a first operating condition, operating a valve to inhibit fluidic communication between an output of the first pump and an output the second pump; and during a second operating condition, operating the valve to permit fluid flow between the output of the first pump and the output of the second pump. In one example, the method may further comprise during the first operating condition running the electric motor at a first speed; and during the second operating condition running the electric motor at a second speed that is greater than the first speed. In one example, the first operating condition is initiating or anticipating a shift event and the second operating condition is cessation of the shift event. Further, in one example, the shift event may include engaging a first clutch and disengaging a second clutch. Further, in one example, closing the valve may include energizing a solenoid.

In yet another aspect, a transmission pump assembly for an electric vehicle (EV), is provided that comprises an electric motor rotationally coupled to a first pump, a second pump, and a third pump via a drive shaft; wherein an output of the first pump is in fluidic communication with a lubrication circuit; and wherein an output of the third pump is in fluidic communication with an actuation circuit; a valve fluidly coupled to the output of the first pump and an output of the second pump; and a controller including instructions stored in non-transitory memory that when executed, during or in anticipation to a shift event, cause the controller to: operate the valve and the electric motor to increase a flowrate of a fluid delivered to the actuation circuit. Further, in one example, the controller may further comprise instructions stored in the non-transitory memory that when executed, in response to termination of the shift event, cause the controller to: operate the valve and the electric motor to decrease a flowrate of the fluid delivered to the actuation circuit. Further, in one example, operating the valve and the electric motor to decrease the flowrate of the fluid delivered to the actuation circuit may include decreasing a speed of the electric motor and opening the valve. Even further, in one example, the shift event may include engaging one wet clutch or brake while disengaging another wet clutch or brake. Still further, in one example, operating the valve and the electric motor to increase the flowrate of the fluid delivered to the actuation circuit may include increasing a speed of the electric motor and closing the valve.

In any of the aspects or combinations of the aspects, the displacements of each of the first, second, and third pumps may vary.

In any of the aspects or combinations of the aspects, the first operating condition may be initiating or anticipating a shift event and the second operating condition may be cessation of the shift event.

In any of the aspects or combinations of the aspects, the shift event may include engaging a first clutch and disengaging a second clutch.

In any of the aspects or combinations of the aspects, closing the valve may include energizing a solenoid.

In any of the aspects or combinations of the aspects, the electric motor may not be included in an electric powertrain.

In another representation, an oil delivery system for an electric vehicle (EV) transmission is provided that comprises a first fixed displacement pump, a second fixed displacement pump, and a third fixed displacement pump cooperatively driven via an electric motor shaft and a controllable valve designed to selectively inhibit fluidic communication between the first and the second fixed displacement pump and a check valve positioned in a crossover oil line that extends between an output of the second and third fixed displacement pumps, and a controller designed to close the valve during shifting operation.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the electric drive unit and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
- an electric motor rotationally coupled to a first pump, a second pump, and a third pump via a drive shaft;
- wherein an output of the first pump is in fluidic communication with a lubrication circuit; and
- wherein an output of the third pump is in fluidic communication with an actuation circuit;
- a valve fluidly coupled to the output of the first pump and an output of the second pump;
- a check valve positioned in a line that fluidly connects the output of the second pump with the output of the third pump when a pressure at the output of the second pump exceeds a predetermined value; and
- a controller including instructions stored in non-transitory memory that when executed, during a first operating condition, cause the controller to:
  - selectively operating the valve based on a change in one or more operating conditions in the transmission system.

2. The transmission system of claim 1, wherein the change in the one or more operating conditions includes initiation or anticipation of a shift event.

3. The transmission system of claim 2, wherein selectively operating the valve based on the change in the one or more operating conditions includes:
- during or in anticipation of the shift event, operating the valve to inhibit fluidic communication between the outputs of the first pump and the second pump.

4. The transmission system of claim 3, wherein selectively operating the valve based on the change in the one or more operating conditions includes:
- subsequent to the shift event, operating the valve to permit fluidic communication between the outputs of the first pump and the second pump.

5. The transmission system of claim 1, wherein the first pump, the second pump, and the third pump are fixed displacement pumps.

6. The transmission system of claim 5, wherein displacements of each of the first pump, the second pump, and the third pump vary.

7. The transmission system of claim 1, wherein the actuation circuit includes one or more hydraulic actuators for one or more wet friction clutches and/or brakes.

8. A method for operation of a transmission system, comprising:
- operating an electric motor to drive a first pump, a second pump, and a third pump via a drive shaft;
- during a first operating condition, operating a valve to inhibit fluidic communication between an output of the first pump and an output of the second pump, and running the electric motor at a first speed; and
- during a second operating condition, operating the valve to permit fluid flow between the output of the first pump and the output of the second pump, and running the electric motor at a second speed that is greater than the first speed.

9. The method of claim 8, wherein the first operating condition is initiating or anticipating a shift event and the second operating condition is cessation of the shift event.

10. The method of claim 9, wherein the shift event includes engaging a first clutch and disengaging a second clutch.

11. The method of claim 8, wherein closing the valve includes energizing a solenoid.

12. The method of claim 8, wherein the first pump, the second pump, and the third pump are fixed displacement pumps.

13. A transmission pump assembly for an electric vehicle (EV), comprising:
- an electric motor rotationally coupled to a first pump, a second pump, and a third pump via a drive shaft;
- wherein an output of the first pump is in fluidic communication with a lubrication circuit; and
- wherein an output of the third pump is in fluidic communication with an actuation circuit;
- a valve fluidly coupled to the output of the first pump and an output of the second pump; and
- a controller including instructions stored in non-transitory memory that when executed, during or in anticipation to a shift event, cause the controller to:
  - operate the valve and the electric motor to increase a flowrate of a fluid delivered to the actuation circuit, including increasing a speed of the electric motor and closing the valve.

14. The transmission pump assembly of claim 13, wherein the controller further comprises:
- instructions stored in the non-transitory memory that when executed, in response to termination of the shift event, cause the controller to:
  - operate the valve and the electric motor to decrease the flowrate of the fluid delivered to the actuation circuit.

15. The transmission pump assembly of claim 14, wherein operating the valve and the electric motor to decrease the flowrate of the fluid delivered to the actuation circuit includes decreasing a speed of the electric motor and opening the valve.

16. The transmission pump assembly of claim 13, wherein the shift event includes engaging one wet clutch or brake while disengaging another wet clutch or brake.

17. The transmission pump assembly of claim 13, wherein the electric motor is not included in an electric powertrain.

* * * * *